(12) United States Patent
Lin et al.

(10) Patent No.: US 6,344,584 B2
(45) Date of Patent: Feb. 5, 2002

(54) PROCESS FOR PRODUCING STYRENE SULFONATE CATION

(75) Inventors: Juchui Ray Lin, Bedford; Leon Mir, Newton; Yongchang Zheng, Watertown, all of MA (US)

(73) Assignee: Ionics, Incorporated, MA (US)

( * ) Notice: Subject to any disclaimer, the term of this patent is extended or adjusted under 35 U.S.C. 154(b) by 12 days.

(21) Appl. No.: 09/785,846

(22) Filed: Feb. 16, 2001

Related U.S. Application Data

(62) Division of application No. 09/046,292, filed on Mar. 23, 1998, now Pat. No. 6,221,248.

(51) Int. Cl.⁷ .............................................. G07C 309/01
(52) U.S. Cl. ............................ 562/87; 556/27; 556/139
(58) Field of Search ....................... 562/45, 87; 556/27, 556/139

(56) References Cited

U.S. PATENT DOCUMENTS

| | | |
|---|---|---|
| 3,737,045 A | 6/1973 | Hashimoto et al. |
| 4,029,640 A * | 6/1977 | Hattori et al. ................. 592/82 |
| 4,060,673 A | 11/1977 | Dey |
| 4,110,366 A | 8/1978 | Tamabayashi et al. |
| 4,138,501 A | 2/1979 | Chaveron et al. ............ 426/239 |
| 4,511,712 A | 4/1985 | Florence ..................... 528/488 |
| 4,540,762 A | 9/1985 | Turner ........................ 526/262 |
| 4,952,466 A | 8/1990 | Cipriano et al. ............ 429/104 |
| 5,202,402 A | 4/1993 | Funaki et al. |
| 5,203,982 A | 4/1993 | MacDonald ................. 204/301 |
| 5,223,107 A | 6/1993 | Batchelder ................ 204/182.6 |
| 5,262,255 A | 11/1993 | Ito et al. ...................... 429/217 |
| 5,264,125 A | 11/1993 | MacDonald et al. |
| 5,520,813 A | 5/1996 | Korin et al. ................. 210/638 |

OTHER PUBLICATIONS

PCT International Search Report, International filing date Mar. 23, 1999, Application No. PCT/US9906397, Mailing date Jun. 24, 1999.

\* cited by examiner

*Primary Examiner*—Christopher Henderson

(57) ABSTRACT

Novel styrene sulfonate-based polymers and cation exchange membranes which are particularly suitable for use in electrodialysis of whey and improved methods for electrodialysis of whey are disclosed.

7 Claims, No Drawings

PROCESS FOR PRODUCING STYRENE SULFONATE CATION

RELATED APPLICATIONS

The following application is a divisional application of U.S. patent application Ser. No. 09/046,292, filed Mar. 23, 1998 now U.S. Pat. No. 6,221,248.

The present invention relates to improvements in electrodialysis. In particular, the invention relates to membranes and to electrodialysis apparatus which are particularly suitable for purification of whey.

BACKGROUND OF THE INVENTION

Whey, the supernatant fluid derived from removal of some or all of the casein from milk, is a rich source of lactose and protein. Whey may be produced by acidification of skim milk to a pH of about 4.7, which causes the casein to precipitate. Casein can be further purified and used in cheese making, in manufacture of some plastics and for other purposes. Acidification of milk to produce whey may be performed by addition of lactic or other acid, producing "acid" whey, or enzymatically, producing "sweet" whey. Acid whey is produced, for example, as a byproduct of the process for making cottage cheese. Sweet whey is a byproduct of some other cheese making processes e.g. cheddar. Sweet and acid whey differ mainly in acidity (attributable to the presence of lactic or other acid), mineral content, and fat content. Sweet whey has a pH of about 5.9 to 6.5, containing about 0.5 weight % inorganic salts (also referred to as "ash") and about 0.2 to 0.4 weight % fat. Acid whey has a pH of about 4.3 to 4.6, containing about 0.7 to 0.8 weight % ash and about 0.05 to 0.1 weight % fat.

After the salts (i.e. ash) and lactic acid are reduced or substantially removed, whey can be used as an additive to animal feed or to a variety of human foods such as protein and citrus drinks, dry mixes, confectionery coatings, ice cream, bakery goods, and the like. A particular utility of whey, in the form of reduced mineral whey (RMW), is as an additive to human infant formula. By virtue of the removal of casein, whey produced from bovine milk has a protein composition which conforms closely to that of human milk, in contrast to the protein composition of whole bovine milk. For this reason, RMW derived from bovine milk is a particularly suitable infant formula additive. Sweet whey derived from cheese making processes is preferably used to produce RMW for infant formula, resulting in an efficient and profitable use of a by-product.

Electrodialysis (ED) is commonly employed to produce RMW for use in infant formula because of its gentle method of desalting. Typically, 85 to 95% of the minerals may be removed from whey in a batch or a continuous ED process. Worldwide ED production of demineralized whey is in excess of 150,000 metric tons (330 million pounds) of RMW solids (dry basis) per year. ED facilities may have an installed capacity to demineralize as much as 500,000 kg (1.1 million pounds) or more per day of fluid whey. ED methods which are particularly suitable for demineralization of whey are disclosed, for example, in commonly assigned U.S. Pat. No. 5,223,107, which is incorporated herein by reference.

In general, ED methods and apparatus purify through electric field-mediated transfer of ions through membranes from less concentrated compartments (diluting or permeate streams) to more concentrated compartments (concentrating or brine streams). Anion transfer and cation transfer membranes are alternated in ED methods and apparatus, the membranes being placed between an anode and a cathode across which an electric field is applied. Anion transfer membranes allow passage substantially only of negatively charged low molecular weight species (anions), and cation transfer membranes allow passage substantially only of positively charged low molecular weight species (cations). The combination of an anode, a cathode, and the alternating anion and cation transfer membranes therebetween is commonly referred to as an ED "stack".

Several problems are inherent to electrodialysis of whey. ED membranes are particularly vulnerable to fouling during purification of whey. Calcium is present in whey at relatively high concentrations, and during ED calcium salts can precipitate in the brine stream and on membrane surfaces. Acid may be added to the brine stream to prevent such precipitation: however, use of large volumes of acid creates cost and disposal problems.

Certain cation exchange membranes have proven particularly suitable for use in ED of whey. For example, cation exchange membranes based on sulfonated polystyrene are routinely employed for ED of whey, since they are particularly stable in the presence of alkaline and acid washing solutions used for sanitation of ED equipment.

Sulfonated polystyrene based cation exchange membranes were initially manufactured by a multi-step process: in the first step, monomers such as divinyl benzene and styrene, in a water insoluble organic solvent such as diethyl benzene, were polymerized on a reinforcing fabric. In the second step, the resulting solid polymer was sulfonated in a second water insoluble organic solvent, such as ethylene dichloride. The finished membrane was produced by washing with a polar organic solvent such as methanol and then neutralizing with aqueous sodium bicarbonate. The multi-step process causes significant chemical disposal problems, since the monomers employed are all water insoluble, and the polymerization and subsequent reactions are therefore carried out in water insoluble solvents. Another disadvantage of the multi-step process is that sulfonation may occur more heavily at the surface of the membrane than in its interior, producing membranes having high electrical resistance.

U.S. Pat. No. 4,540,762 discloses copolymerization of sodium-N-(4-sulfophenyl) maleimide and a styrene sulfonate salt to produce a linear (i.e., not cross-linked), water soluble polyelectrolyte for use as a deflocculating agent in water-based drilling muds. U.S. Pat. No. 4,511,712 discloses a method of isolating ionic polymers, including styrene homopolymers, in the salt form. U.S. Pat. No. 4,060,673 discloses salts of polystyrene sulfonates to produce water soluble ion exchange membranes for use as permselective barriers in organic electrode batteries. U.S. Pat. No. 4,110,366 discloses a process for producing an alkali metal styrene sulfonate by an extraction/back-extraction process.

The ion exchange capacity obtainable from quaternary ammonium styrene sulfonate salts as disclosed in commonly assigned U.S. Pat. No. 5,203,982 may be limited by the solubilities of such styrene sulfonate quaternary ammonium salts in polar solvents. Such patent is also incorporated herein by reference. In addition, since styrene sulfonate quaternary ammonium salts are relatively large molecules, the resulting membranes have sufficiently large interstices that lactose may transfer out of the diluting compartment during electrodialysis of whey. A high lactose content in the brine stream may create waste disposal problems related to the biochemical oxygen demand of lactose.

A need exists, therefore, for additional methods and membranes useful in electrodialytic purification of whey and other liquids.

SUMMARY OF THE INVENTION

The present invention provides an improved process for manufacturing styrene sulfonate-based cation exchange membranes, which are useful for a variety of applications, including electrodialysis of whey.

In one preferred embodiment, the invention provides a process for making a polymer comprising the step of reacting a styrene sulfonate metal salt, with or without a crosslinking agent, in an organic polar solvent for a time and at a temperature sufficient to cause polymerization of such styrene sulfonate metal salt to occur. This embodiment also encompasses polymers made using this process, the polymers being suitable for use in any process or apparatus that employs styrene sulfonate based polymers. Crosslinked polymers formed using the method of this embodiment are particularly suitable as ion exchange resin particulates and as components of cation exchange membranes employed in electrodialysis of whey or other liquids. Uncrosslinked polymers formed using the method of the invention are particularly suitable for use as polyelectrolytes in electric cells such as rechargeable batteries. This embodiment further provides an electrodialysis apparatus comprising fabric reinforced crosslinked cation exchange membranes made using the process of the invention.

In another preferred embodiment, the invention provides a process for producing a styrene sulfonate metal salt which is soluble in polar organic solvents, comprising the steps of dissolving sodium or potassium styrene sulfonate in an aqueous solution; converting the dissolved sodium or potassium styrene sulfonate to styrene sulfonic acid; adding an ionic form of a suitable metal to such styrene sulfonic acid, thereby forming the styrene sulfonate salt of such metal; and isolating the resulting styrene sulfonate salt.

DETAILED DESCRIPTION OF THE PREFERRED EMBODIMENTS

Styrene sulfonate-based polymers are produced in accordance with the invention through polymerization of a styrene sulfonate salt which is soluble in an organic polar solvent. The resulting styrene sulfonate-based polymers may be crosslinked or uncrosslinked. Crosslinked polymers suitable for incorporation into fabric reinforced cation exchange membranes are produced in accordance with the present invention through copolymerization of a crosslinking monomer with such styrene sulfonate metal salt. Any styrene sulfonate metal salt may be used in the process of the invention, so long as the solubility of such metal salt in the solvent is very much greater than the solubility of sodium or potassium styrene sulfonate in the solvent. Preferably, the styrene sulfonate metal salt used in the process of the invention is lithium styrene sulfonate, magnesium styrene sulfonate, calcium styrene sulfonate, aluminum styrene sulfonate, ferrous styrene sulfonate, ferric styrene sulfonate, or ammonium styrene sulfonate. More preferably the styrene sulfonate metal salt monomer used in the process of the invention is lithium styrene sulfonate.

The styrene sulfonate metal salt may be produced for use in the process of the invention, for example, as set forth in chapter 4 of *Functional Monomers*, vol. 1, Yocum et al. ed. (Marcel Dekker, Inc., 1973), by sulfonating ethylbenzene with chlorosulfuric acid (or with sulfuric acid followed by chlorination with $PCl_5$,) to produce p-ethylbenzenesulfonyl chloride which is then purified by fractional distillation, brominated, and subsequently debrominated with the hydroxide of the desired metal. When LiOH is employed in this process, pure p-lithium styrene sulfonate is produced.

Alternatively, the styrene sulfonate metal salt may be produced for use in the process of the invention by exchange of the desired metal ion with hydrogen from styrene sulfonic acid. Styrene sulfonic acid is generated by exposing sodium or potassium styrene sulfonate, which are commercially available, to a hydrogen form of a cation exchange resin. Example 1 describes production of lithium styrene sulfonate using this method. Other styrene sulfonate metal salts soluble in polar organic solvents may be similarly produced for use in the method of the invention.

The styrene sulfonate metal salt soluble in polar organic solvents produced in accordance with the invention may be polymerized as set forth below, in the presence of crosslinking monomer, to make a water insoluble polymer, or in the absence of a crosslinking monomer to produce a water soluble polymer. The styrene sulfonate metal salt may also be copolymerized with other monomers e.g. styrene, ethyl vinyl benzene, vinyl toluene with or without a crosslinking monomer.

Styrene sulfonate metal salt soluble in a polar organic solvent may also be produced in situ in such polar solvent by reacting commercially available sodium styrene sulfonate or potassium styrene sulfonate dispersed in such solvent with a suitable "non-styrene sulfonate" salt according to the reaction:

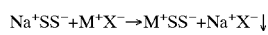

$$Na^+SS^- + M^+X^- \rightarrow M^+SS^- + Na^+X^- \downarrow$$

in which $SS^-$ represents styrene sulfonate anion, $M^+$ represents a cation which forms a styrene sulfonate salt which is soluble in the organic polar solvent and $X^-$ represents an anion which forms a sodium salt (alternatively potassium salt) which is insoluble in such solvent. It will be clear from the above equation that the driving force for the reaction in the insolubility of $Na^+X^-$ (or $K^+X^-$) compared to $Na^+SS^-$, $M^+X^-$ and $M^+SS^-$. $Na^+SS^-$ and $M^+X^-$ must both have at least limited solubility in the polar solvent for the reaction to proceed. A few tests can easily select a suitable combination of solvent and salt $M^+X-$.

Example 4 sets forth production of a water insoluble membrane from lithium styrene sulfonate and divinyl benzene using this method. A styrene sulfonate metal salt produced in this way may be made prior to addition of the crosslinking monomer or simultaneously with addition of the crosslinking monomer.

Any crosslinking monomer may be employed in the process of the invention, so long as the crosslinking monomer is soluble in the polar organic solvent employed for the polymerization reaction in the presence of the polar organic solvent soluble styrene sulfonate salt, and so long as such crosslinking monomer is capable of copolymerizing with the styrene sulfonate metal salt employed for the polymerization reaction. Suitable crosslinking monomers include, for example, a divinyl benzene, a diisopropenyl benzene, a divinyl toluene, a divinyl naphthalene, a divinyl diphenyl, a divinylphenyl vinyl ether, a divinyl dimethylbenzene and equivalents thereof. Suitable equivalents include, for example, a divinyl sulfone, a divinyl cyclohexane, a trivinyl cyclohexane, a diacrylate or a dimethacrylate of an alkane diol such as ethylene glycol dimethacrylate or tetramethylene glycol dimethacrylate, a tetraacrylate or tetramethylacrylate of pentaerythritol, and the like. Other vinyl group-containing compounds may also be present and may participate in the copolymerization reaction. Such compounds include, for example, styrene, vinyl toluenes, ethyl vinyl benzenes, vinyl naphthalenes, vinyl chlorobenzenes, vinyl xylenes, alpha substituted derivatives of styrene, vinyl toluenes, vinyl naphthalenes, vinyl chlorobenzenes, and vinyl xylenes, alkyl acrylates, alkyl methacrylates, butadiene, isoprene, acrylonitrile, and the like. The presence of such compounds in polymers made by the process of the invention will not change the essential performance of the polymers or their suitability for the uses described herein, so long as the cation exchange polymers produced have equivalent weights of not more than about 1000 (i e., a cation exchange capacity of not less than about 1 mg equivalent per g polymer) in the sodium form, on a substantially dry basis not including any reinforcing medium or substrate which may be present.

Any polar organic solvent is suitable for use in the method of the invention, so long as the solvent is not itself polymerizable. Preferably, the solvent has a low frequency dielectric constant greater than about 10. More preferably, the solvent has a low frequency dielectric constant greater than about 30. Preferably, the solvent has a Hildebrand solubility parameter greater than about 10 $(cal/cm^3)^{1/2}$. Preferably the solvent will dissolve at least 10%, more preferably 20%, by weight of the non-sodium, non-potassium styrene sulfonate. For example, formamide, N,N-dimethyl formamide, N,N-dimethyl acetamide, 2-pyrrolidone, N-methyl 2-pyrrolidone, dimethyl sulfoxide, ethylene carbonate, propylene carbonate, γ-butyrolactone, 1,3-butane diol, 1,4-butane diol, 2,3-butane diol, 1,3-propylene glycol, 1,2-propylene glycol, sulfolane, glycerine, tetrahydrofurfural alcohol, 1,2,4-butane triol, ethylene glycol, monopropylene glycol monomethyl ether, dipropylene glycol monomethyl ether, tripropylene glycol monomethyl ether, ethylene glycol monomethyl ether, ethylene glycol monoethyl ether, diethylene glycol, diethylene glycol monomethyl ether, diethylene glycol monoethyl ether, triethylene glycol, and the like. Minor amounts of other polymers, for example, styrene-butadiene copolymer, styrene-isoprene copolymer, polyvinyl alcohol, and the like, may be added to the solvent in accordance with the method of the invention.

The styrene sulfonate metal salt, with or without other vinyl compounds, may be polymerized using any known method. Similarly, the styrene sulfonate metal salt and crosslinking monomer, with or without other vinyl compounds, may be copolymerized using any known method. The copolymerization method employed will correspond to the end use of the polymer. In general, the styrene sulfonate metal salt in the polar organic solvent, alone or in the presence of a crosslinking monomer and/or a polymerization catalyst, is polymerized by heating. The polymerization reaction may be performed at a temperature within the range from about 40° C. to about 100° C. Preferably, the polymerization reaction is performed at a temperature within the range from about 60° C. to about 80° C.

A polymerization initiating catalyst may optionally be added to the reaction mixture. Any polymerization initiating catalyst may be used in accordance with the invention, including those which are spontaneously active and those which are activated by heat, by electromagnetic radiation, or by chemical promoters. Anionic, cationic, or coordination initiators may be used, but free radical initiators such as peroxides, hydroperoxides, and azo compounds are preferred. Many free radical initiators are known, for example, tertiary butyl peroctoate ("TPO"), 2,4-pentanedione, potassium persulfate, hydrogen peroxide, tertiary butyl hydroperoxide, benzoyl peroxide, 2,2'-azobis (2-amidopropane) dihydrochloride, 4,4'-azobis (4-cyanopentanoic acid), 2-azobis (isobutyronitrile), azobis-methylisobutyrate, and the like. In general, the amount of polymerization initiating catalyst is about 0.01% to about 2% of the weight of the monomers employed in the polymerization reaction.

The polymers formed using the process set forth above may be used in many ways, for example in the form of particulate resins or as membranes. Membranes formed using the process of the invention may be used in electrodeionization, electrodialysis, electrolysis, or as cell separators in batteries. Uncrosslinked, water soluble membranes are preferred for use in batteries, as described more fully in U.S. Pat. Nos. 4,060,673 and 4,952,466. Crosslinked, fabric reinforced water insoluble membranes are preferred for use in electrodialysis, and the styrene sulfonate cation exchange membranes of the present invention are particularly preferred for use as components of an apparatus employed in electrodialysis of whey, other milk-based fluids, or other liquids.

When polymers manufactured by the process of the invention are used as membranes, the membrane may be formed by casting the polymer on a reinforcing material or substrate. Suitable substrates for cast membranes include woven synthetic fabrics such as polypropylene cloth, polyacrylonitrile cloth, polyacrylonitrile-co-vinyl chloride cloth, polyvinyl chloride cloth, polyester cloth, and the like. Other suitable substrates include glass filter cloth, polyvinylidene chloride screen, glass paper, treated cellulose battery paper, polystyrene-coated glass fiber mat, polyvinyl chloride battery paper, and the like.

The following examples illustrate the preferred modes of making and practicing the present invention, but are not meant to limit the scope of the invention since alternative methods may be used to obtain similar results.

EXAMPLE 1

Production of Lithium Styrene Sulfonate

Lithium styrene sulfonate may be made using ion exchange of commercially available sodium or potassium styrene sulfonate as set forth below:

A 20% sodium styrene sulfonate solution is made by dissolving 200 g solid sodium styrene sulfonate (purity 81%, Tosoh, Japan) in water to 1 liter of solution with 500 ppm methylhydroquinone, added as a polymerization inhibitor. Insoluble solids are filtered out of the solution. The solution is then passed through a one liter column of cation exchange resin in the hydrogen form at a flow rate of 7 ml/min. Any strongly acid cation exchange resin may be used such as:

Amberlite IR 118, 120 or 200 (Rohm and Haas Co., Philadelphia, Pa., USA);

Dowex 50 WX4 (Dow Chemical Co., Midland, Mich., USA);

Purolite C-100E, C-120E, C-145 or C150 (The Purolite Co., Bala Cynwyd, Pa.,USA). The yield from the ion exchange column is about one liter of hydrogen styrene sulfonate, which is then neutralized by addition of LiOH.$H_2$O powder (approximately 33 g) until the pH of the solution is about 7. The resulting solution of lithium styrene sulfonate in water is dried. A yield of about 143 g lithium styrene sulfonate (a white or grey powder) with a water content of about 9.9% is obtained.

EXAMPLE 2

Synthesis of Cation Exchange Membrane using Solid Lithium Styrene Sulfonate

In a 500 ml flat bottomed flask, 147.5 g N-methyl pyrrolidone ("NMP"), 130 g divinyl benzene ("DVB" 80%) and 5 mg methyl hydroquinone are combined at a temperature of 60–65° C. 130 grams of dried lithium styrene sulfonate ("LISS") is then added, with stirring, and allowed to dissolve slowly until a clear solution is obtained. The solution contains therefore about 36% NMP by weight, 32% DVB and 3.2% LISS. The solution is allowed to cool to room temperature, and a polymerization initiator, azobis methyl-isobutyrate (Polysciences Inc., Warrington, Pa., USA) is added to a final concentration of about 1.6% of the total solution volume and allowed to dissolve with stirring. The polymerizable reaction mixture is filtered and a brown, clear filtrate is collected.

A polypropylene cloth substrate for the membrane is impregnated with the filtrate collected above and allowed to cure between glass plates in an 85° C. oven for one hour. The membrane thus obtained is sequentially soaked in water for 30 minutes, in 2N NaCl for 2 hours, and in water for 30 minutes. Using standard procedures, the following membrane characteristics are determined. Cation exchange capacity in milligram-equivalents per gram of dry cation exchange in the sodium form (i.e., not including fabric) is about 1.96 meq/g. Water content as percent by weight of the wet cation exchange resin in the sodium form (i.e., not including fabric) is about 36.9%. The areal resistance of 11.2 ohm-cm$_2$ is that of a square centimeter of membrane in the sodium form measured in 0.01 N NaCl at 1 kHz. The thickness of the membrane is about 0.057 cm.

EXAMPLE 3

Synthesis of Higher Capacity Cation Exchange Membrane using Solid Lithium Styrene Sulfonate The procedure set forth in Example 2 is used with the following formulation of starting materials, to produce a membrane having a capacity of 2.24 meq/g; water content of 41.1%; a resistance of 9.8 ohm-cm$^2$; and a thickness of 0.057 cm.

N-methyl pyrrolidone: 28.4 g (39% by weight)

Divinyl benzene (80%): 21.3 g (29% by weight)

Dried lithium styrene sulfonate: 22.8 g (31% by weight)

Azobis methylisobutyrate: 1% of total volume

EXAMPLE 4

Synthesis of Cation Exchange Membrane using Sodium Styrene Sulfonate and LiCl

In a 500 ml flat bottomed flask, 50 ml (52.2 g) N-methylpyrrolidone and 50 ml divinyl benzene (80%) are combined at a temperature of 70° C. with stirring. Ten grams of LiCl and 80 mg methylhydroquinone are added to the solution. Subsequently, 50 g sodium styrene sulfonate (81%) are added to the solution forming a suspension, and the reaction allowed to proceed at 70–80° C. for one hour. The LiCl reacts with the suspended sodium styrene sulfonate to form lithium styrene sulfonate and insoluble NaCl. The reaction mixture is allowed to cool to room temperature, and insoluble materials (NaCl and unreacted insoluble sodium styrene sulfonate) are removed by filtration. A brown, clear filtrate (121 g) is obtained for use in membrane synthesis.

To the filtrate is added about 1.6 weight % azobis methyl isobutyrate, and the casting procedure set forth in Example 2 is used to make a cation exchange membrane. The membrane obtained using sodium styrene sulfonate and LiCl has a capacity of about 1.94 meq/g, a water content of about 36.7%, a resistance of about 11.3 ohm-cm$^2$, and a thickness of about 0.058 cm.

EXAMPLE 5

Lactose Transport Studies

Lactose transport of the ion exchange membranes produced above is determined by applying a known quantity of d.c. current to a four cell lab ED unit. The ED unit consists of four LUCITE cells (¾"×3½"×3½") each with a circular compartment 1½" in diameter, each cell having inlet and outlet tubes. The unit also has two 3½"×3½" platinum plated titanium sheet electrodes. Standard ion exchange membranes (cation: CR61 CZL; anion: AR 103 QZL, both from Ionics, Incorporated, Watertown, Ma.) are used with the exception that the membrane between the diluting and the concentrating cells is the test membrane. A 20% of lactose solution with 0.2 N NaCl is circulated in diluting compartment. The concentrating compartment contains 0.02 N NaCl solution. A 0.2 N Na$_2$SO$_4$ solution is circulated through the electrode compartments. The membrane is tested with a direct current of 160 milliamperes for 30 minutes. Lactose is transported from the diluting compartment through the test membrane to the concentrating compartment when the DC current is applied. Concentration of lactose in concentrating compartment is measured through UV spectroscopy. Lactose transport numbers are about 2.79 and 2.75 g/Faraday for the cationic membranes of Examples 2 and 3, respectively, which are extrapolated to 30% lactose. In contrast, lactose transport numbers for membranes produced using the process of U.S. Pat. No. 5,203,982 were >9.0 g/Faraday.

Those skilled in the art will recognize, or be able to ascertain, using no more than routine experimentation, numerous equivalents to the specific substances and procedures described herein. Such equivalents are considered to be within the scope of this invention, and are covered by the following claims.

What is claimed is:

1. A process for producing a styrene sulfonate salt of a desired cation, said styrene sulfonate salt soluble in a polar organic solvent, said process comprising the steps of:
    a) dispersing sodium and/or potassium styrene sulfonate in a polar solvent;
    b) converting the dispersed styrene sulfonate to styrene sulfonic acid;
    c) adding an ionic form of the desired metal cation to the styrene sulfonic acid, thereby forming a polar organic solvent soluble styrene sulfonate salt of the desired metal cation; and
    d) isolating the styrene sulfonate salt of said desired metal cation.

2. The process of claim 1, wherein the metal cation is selected from the group of cations consisting of lithium, magnesium, aluminum, calcium, ferric and ferrous.

3. The process of claim 1, wherein the metal cation is lithium.

4. A process for producing a styrene sulfonate salt of a desired cation, said styrene sulfonate salt soluble in a polar organic solvent, said process comprising the steps of:
    a) dispersing a styrene sulfonate salt in a polar solvent, wherein said styrene sulfonate salt is selected from sodium styrene sulfonate salt, potassium styrene sulfonate salt and combinations thereof;
    b) converting at least part of said dispersed styrene sulfonate salt to styrene sulfonic acid; and
    c) combining the styrene sulfonic acid with an ionic form of the desired metal cation, wherein at least part of said styrene sulfonic acid is converted to a polar organic solvent soluble salt of the desired metal ion.

5. The process of claim 4, further including after step (c):
    d) isolating the styrene sulfonate salt of said desired metal cation.

6. The process of claim 4, wherein the metal cation is selected from the group of cations consisting of lithium, magnesium, aluminum, calcium, ferric and ferrous.

7. The process of claim 4, wherein the metal cation is lithium.

* * * * *